United States Patent [19]

Chiesi et al.

[11] Patent Number: 5,732,000
[45] Date of Patent: Mar. 24, 1998

[54] CASING FOR ELECTRONIC EQUIPMENT, SUCH AS PERSONAL COMPUTERS AND/OR THEIR PERIPHERALS

[75] Inventors: Pier Giorgio Chiesi, Banchette; Egidio Villa, Romano Canavese, both of Italy

[73] Assignee: Olivetti & C. S.p.A., Ivrea, Italy

[21] Appl. No.: 669,539

[22] PCT Filed: Jan. 9, 1995

[86] PCT No.: PCT/EP95/00095

§ 371 Date: Jul. 12, 1996

§ 102(e) Date: Jul. 12, 1996

[87] PCT Pub. No.: WO95/19594

PCT Pub. Date: Jul. 20, 1995

[30] Foreign Application Priority Data

Jan. 13, 1994 [IT] Italy ................. TO94A0009

[51] Int. Cl.$^6$ ................................ G06F 1/18
[52] U.S. Cl. ..................... 364/708.1; 361/679
[58] Field of Search .............. 364/708.1; 361/679, 361/732, 741, 752, 753, 755, 756, 759

[56] References Cited

U.S. PATENT DOCUMENTS

| | | |
|---|---|---|
| 4,718,858 | 1/1988 | Godfrey et al. ............... 493/296 |
| 4,909,579 | 3/1990 | Liu ................................. 312/263 |
| 5,121,296 | 6/1992 | Hsu ................................ 361/685 |
| 5,192,143 | 3/1993 | Lajara e tal. ................... 403/24 |
| 5,660,297 | 8/1997 | Liu ................................. 220/4.02 |

*Primary Examiner*—Chuong Dinh Ngo
*Attorney, Agent, or Firm*—Banner & Witcoff, Ltd.

[57] ABSTRACT

A casing for electronic equipment, such as personal computers (PC) and/or their peripherals, comprises a base (17) for supporting the mechanical and electronic components and a cover (12) removably fixed to the base in order to enclose the components. The casing comprises a locking mechanism or knob unit (24) which can be selectively actuated in order to lock the cover (12) to the base (17). The knob unit (24) is located in the right-hand side wall (14) of the PC and is associated with a similar unit located in the left-hand side wall, so that the cover (12) can be removed in order to access the internal mechanical and electronic components without the aid of tools. The apposite operation, i.e. fixing the cover (12) to the base (17), is also effected by means of the knob unit (24), again without the aid of tools such as screw drivers or the like. The locking mechanism causes hooks or notches (41) on the cover to engage in eyelets of slots (46) on the base as the cover (12) is slid over the base (17) by actuation of the knob unit (24).

12 Claims, 6 Drawing Sheets

CASING FOR ELECTRONIC EQUIPMENT, SUCH AS PERSONAL COMPUTERS AND/OR THEIR PERIPHERALS

BACKGROUND OF THE INVENTION

This invention relates to a casing for electronic equipment, such as personal computers and/or their peripherals, comprising a base adapted to support mechanical and electronic components and a cover adapted to be removably fixed to the base in order to enclose the said components.

In the known casings of this type the cover is fixed to the base by means of rows of screws. These casings have the disadvantage that, in order to access the components of the equipment, tools are required to unscrew and tighten the various screws holding the cover fixed to the base.

In addition, European Patent Application EP-A-0 463 776 describes an enclosure which facilitates access to the interior of a computer by providing hooking means arranged between the cover and the base and adapted to be operated manually. The hooking means include a plurality of hooks on one of the base and the cover, and a plurality of pockets on the other. The hooks and the pockets are disposed along two sides of the base and cover and are connected between them by sliding the cover on the base. The hooks are wedge-shaped for penetrating into the pockets. This enclosure has the disadvantage that the force required by the operator to insert the wedge-shaped hooks into the pockets is rather high, and the manual operations for connecting or disconnecting the cover and the base are uncomfortable, the operator being obliged to hold the cover firmly during such operations.

The object of this invention is to produce a casing which is simple, inexpensive, reliable and easy to assemble and which allows for easy access to the internal components of the equipment, without the need for tools, and further which is comfortable to use and does not require excessive effort from the operator.

SUMMARY OF THE INVENTION

The invention is defined in the independent claims below, to which reference should now be made. Preferred features of the invention are set forth in the appendant claims.

A preferred casing embodying the invention, which is described in more detail below with reference to the drawings, includes a base for supporting the mechanical and electronic components of a personal computer, and a cover removably fixed to the base in order to enclose the said components. A locking mechanism or knob unit can be selectively actuated in order to lock the cover to the base. There are knob units on either side of the casing. In the preferred embodiment the locking mechanism causes hooks, fins or notches on the cover to engage in eyelets or slots on the base as the cover is slid over the base by actuation of the knob units.

PREFERRED DESCRIPTION OF THE DRAWINGS

The invention will be further described in more detail, by way of non-limiting example, with reference to the accompanying drawings, in which.

Figure 3:
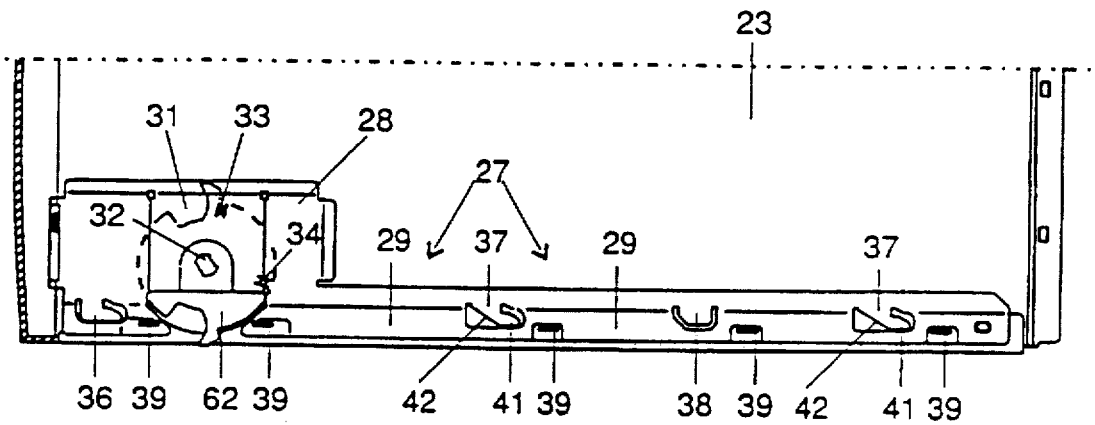
FIG. 3 is a section of part of the casing of FIG. 1.
Figure 4:
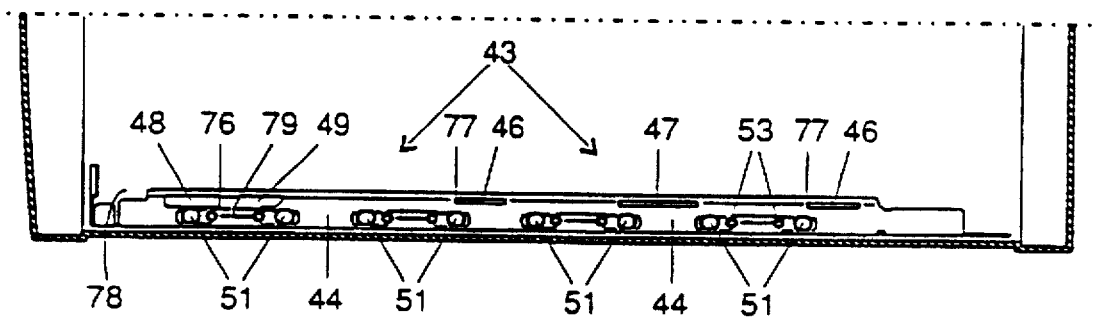
FIG. 4 is a section of another part of the casing of FIG. 1.
Figure 12:
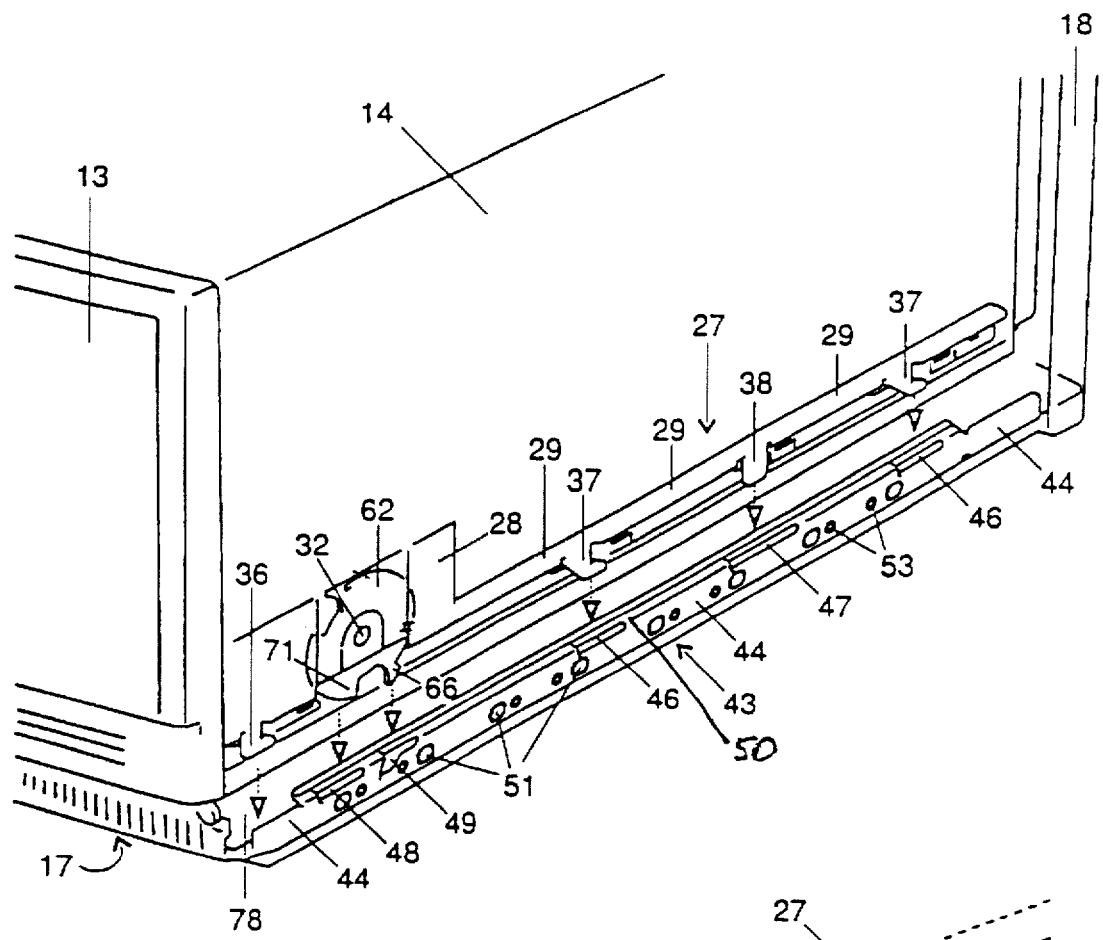
FIG. 12 is a diagrammatic side view of the casing of FIG. 1 in a working position.
Figure 13:
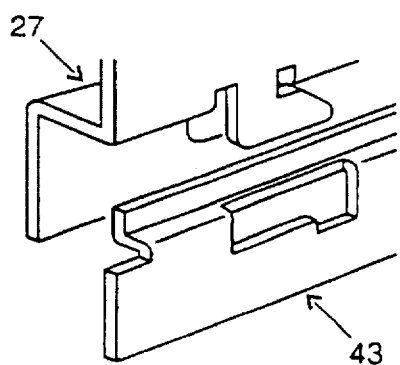
Figure 14:
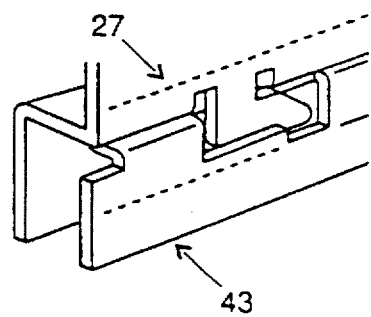
Figure 15:
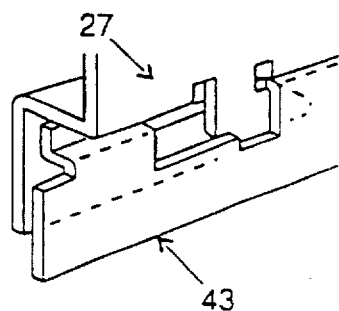

FIGS. 13, 14 and 15 are perspective views of a detail from FIG. 12 in various working positions; and FIGS. 16, 17, 18 and 19 are perspective views of details from FIGS. 3 and 4 in various working positions.

DETAILED DESCRIPTION OF THE PREFERRED EMBODIMENT

Figure 1:
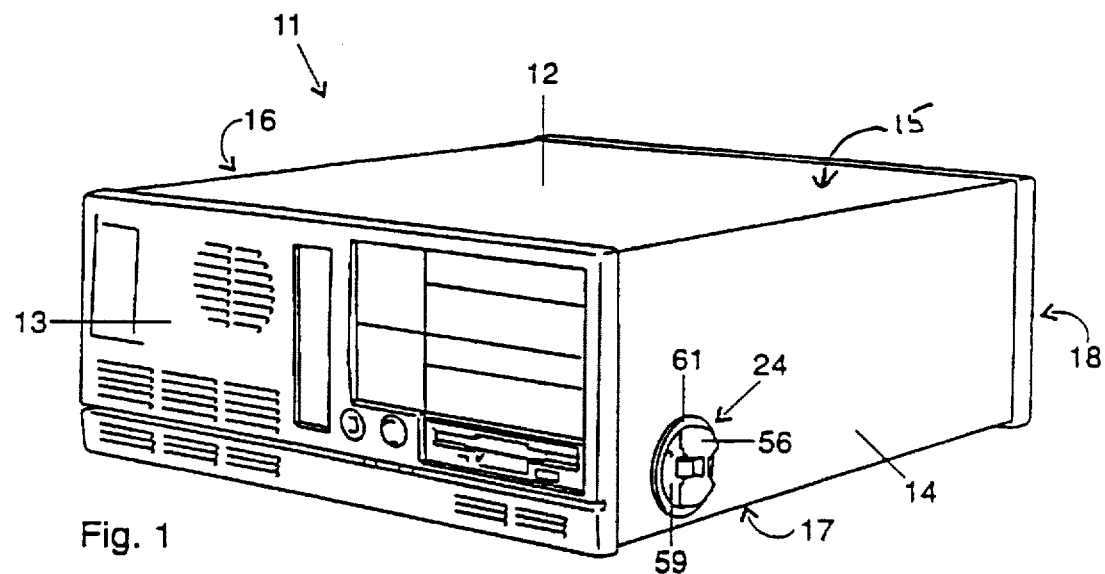
FIG. 1 is a perspective view of the casing for a piece of electronic equipment embodying to the invention.

Referring to FIG. 1, the reference numeral 11 designates a piece of electronic equipment, e.g. a personal computer, referred to hereinafter by the abbreviation PC, the casing of which comprises a cover 12 having a front plate 13, a top 15, and parallel side walls 14 and 16, together with a base 17 and a rear panel 18.

The base 17 is adapted to support the functional units, among which only a unit 19 comprising the magnetic peripherals and a supply unit 21 will be mentioned. The cover 12 comprises an outer part 22 made of plastics and an inner frame 23 formed by metallic panels to shield the PC from RF emissions and simultaneously to provide sufficient structural rigidity.

Figure 2:
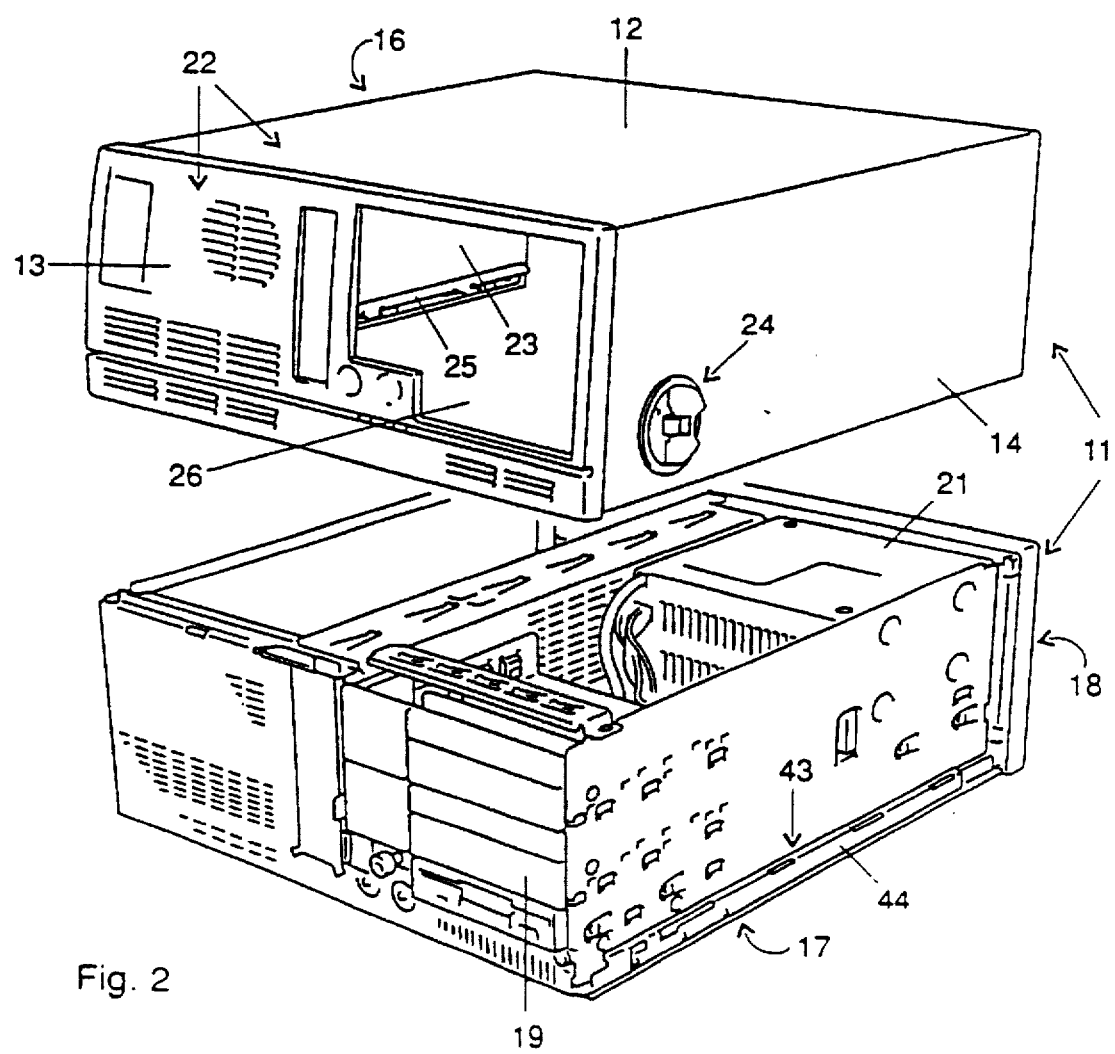
FIG. 2 is an exploded perspective view of the casing of FIG. 1.

FIGS. 1 and 2 show a knob unit 24 which is located in the right-hand side wall 14 and which, in association with a similar unit located in the left-hand side wall of the PC, allows the cover 12 to be removed in order to access the internal mechanical and electronic components without the aid of tools. The opposite operation, i.e. affixing the cover 12 onto the base 17, is also effected by means of the knob unit 24, again without the aid of tools such as screwdrivers or the like.

FIG. 2 shows the computer 11 in an open arrangement with the base 17 and cover 12 separated. This arrangement illustrates the shape of the front plate 13, which has an opening 26 in correspondence with the magnetic peripherals 19.

Devices for guiding, fixing and mechanically sealing the cover to the base 17 are rigidly fixed to the lower part, that is the free ends, of the side walls 14 and 16 of the cover 12. These devices will be referred to hereinafter as longitudinal members. For the sake of brevity, only the right-hand longitudinal member 27 (see FIG. 3) will be described, the left-hand longitudinal member 25 being a mirror image of the right-hand one and having an identical function. The longitudinal member 27 comprises a flange 28 for mechanically supporting the knob unit 24, and an elongate lower part 29 on which are disposed the reciprocal locking devices intended to provide sealing and guiding between the cover 12 and the base 17. The flange 28 is provided in its interior with a seat 31 adapted to house the knob unit in its operative seat, a hole 32 for inserting and fixing the knob unit in the seat 31, and two mechanical stops 33 and 34 for limiting rotation of the knob unit when the cover 12 is being removed from and fitted to the base 17.

The elongate lower part 29 comprises a front fin 36 for locking the cover to the front part of the base of the computer 11, and a row of depressed areas 39 used to fix the longitudinal member 27 to the inner metal frame 23, e.g. by means of welding. The locking device comprises hooked fins 37 formed on the lower part 29 and having a shape adapted to guide the cover over the base and to ensure mechanical sealing, and a locating fin 38 for centring the cover 12 on the base 17. The fins 37 are in turn formed with a stop notch 41 in order to ensure mechanical sealing of the cover 12, and with an inclined plane 42 for fitting and removing the cover.

A bottom plate 43 illustrated in FIG. 4 is situated in the base 17 opposite the longitudinal member 27 and comprises an elongate body 44 on to which open: slots or eyelets 46 for engaging the cover 12, a locating slot and two holding slots 48 and 49 forming part of the device for locking the cover and the base. The lateral edges of the base are each formed by a profile in the shape of an inverted U (FIG. 14).

Figure 5:
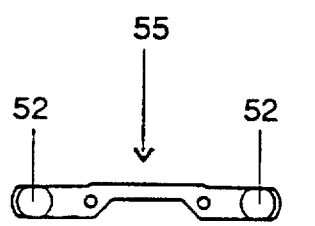
FIG. 5 is a view of a detail from FIG. 4.
Figure 6:
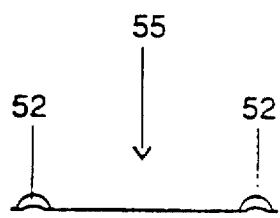
FIG. 6 is another view of the detail of FIG. 5.
Figures 8, 10, 11:
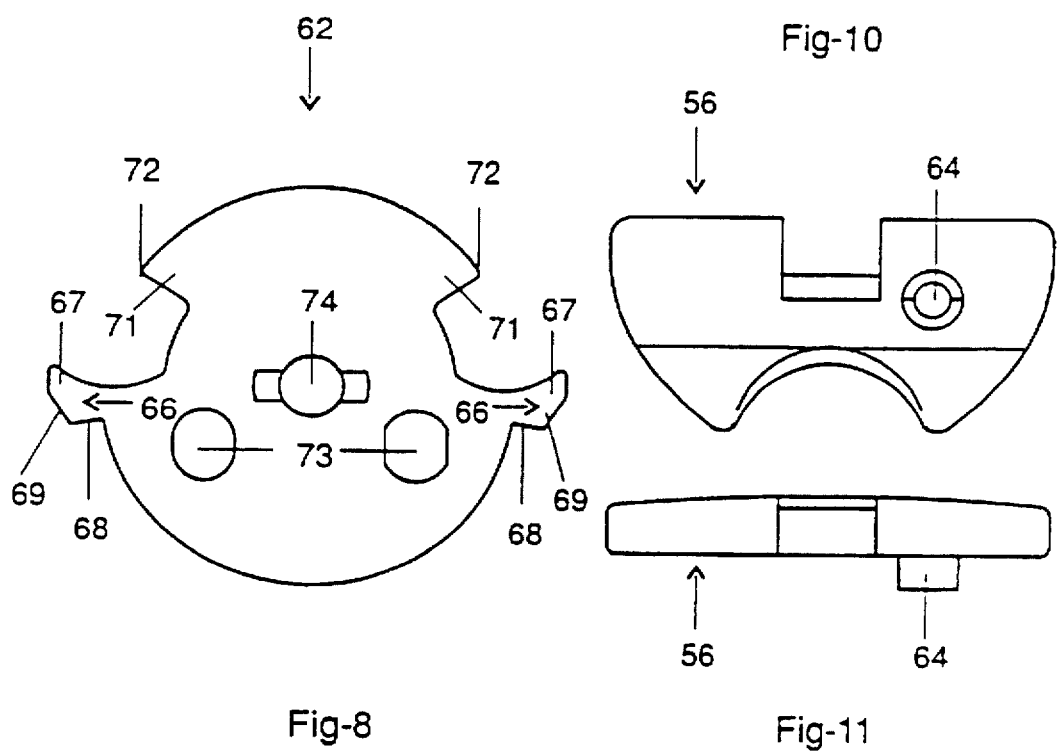
FIG. 8 is a view of a detail from FIG. 7.
FIG. 10 is a view of a detail from FIG. 7.
FIG. 11 is another side view of the detail of FIG. 10.

The longitudinal member 27 also comprises a row of holes 51 and 53. The holes 51 receive hemispherical ends 52 of small springs 55 (FIGS. 5 and 6) for closing contact with the cover 12, and the holes 53 are provided for fixing the bottom plate 43 to the base 17, e.g. by means of spot welding.

The knob unit 24, the constituent parts of which are illustrated in FIGS. 7, 8, 9, 10 and 11, comprises a knob 56 hinged on to a central pivot 57 by means of a pivot pin 58, a circular container 59 bordered by a semi-toroidal edge 61 referred to as a lug, a shaft 63 and an engagement element 62 which acts as a cam and the shape of which is adapted to lock the cover 12 to and release it from the base 17. A locking pin 64 is located on the knob 56 in order to lock the knob 56 in a seat 60 formed in the container 59.

The engagement element 62 is in turn formed by a body of approximately circular shape on which two hooked notches 66 are symmetrically disposed in diametrically opposed positions. Only one is actually required, but by providing two in this way the same element 62 can be used on the left and right sides of the casing. The hooked notches comprise a holding part 67, a flat part 68 acting as a stroke limiter, and an oblique connector 69 for connecting these two parts. The element 62 also comprises two releasing teeth 71 having a sharp-edged holding point 72 for removing the cover 12 from the base, two circular ports 73, and a central hole 74 adapted to receive the shaft 63 of the pivot 57. The notches 66 and teeth 71 can be regarded as forming two opposed pairs of extension pieces.

The longitudinal member 27 and the bottom plate 43 are shown in diagrammatic form in FIGS. 13, 14 and 15 in three different positions showing three states of the computer 11, i.e. the open position, the position for fitting/removing the cover, and the closed position, respectively.

Figures 7, 9:
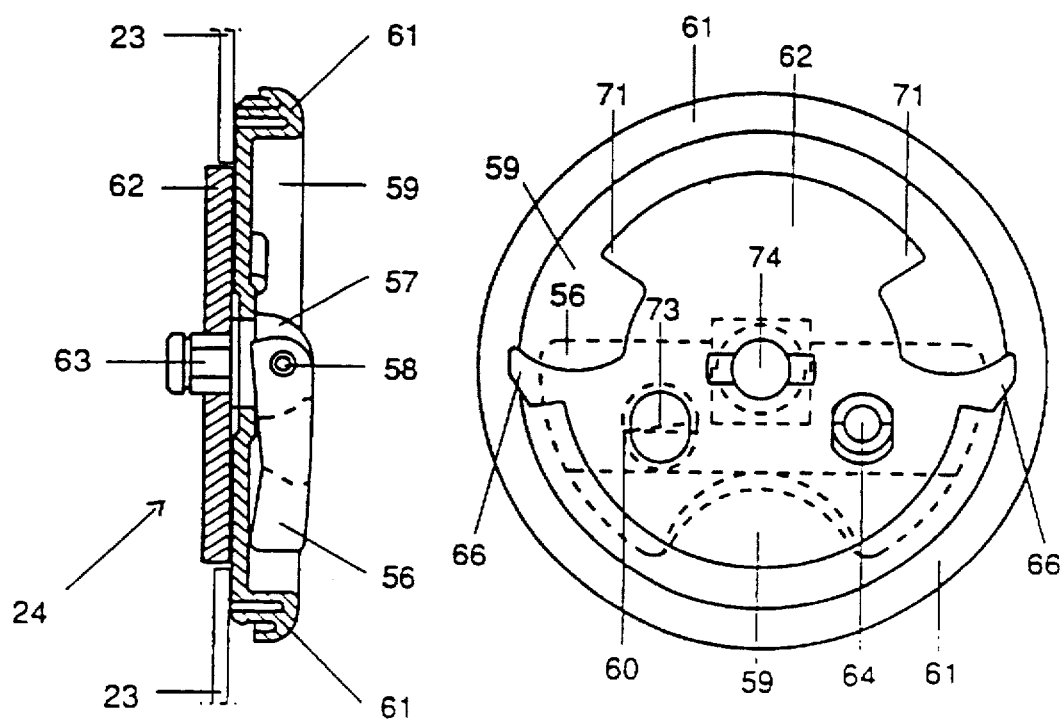
FIG. 7 is a highly enlarged view of a detail from FIG. 1.
FIG. 9 is a lateral section of the view of FIG. 7.

The computer 11 is in the closed arrangement as illustrated in FIG. 1 and in the open arrangement as illustrated in FIG. 2. In order to move from the first arrangement to the second, the knob 56 has to be rotated about the pin 58 so as to move it from a rest state in which it is flush with the casing, as indicated in FIG. 9, to a working state in which the knob 56 projects from the casing.

In the rest state, the body of the knob 56 is parallel to the container 59 and is held in the protective casing provided by the lug 61, and the locking pin 64 is inserted into the port 73 so as to ensure mechanical locking of the knob, thereby preventing movement. Preferably the pin is resiliently biased into the port 73. In the working state, the body of the knob 56 is free to rotate, being situated perpendicularly to the closure container 59, with the locking pin 64 integral with the knob 56 freed from the port 73.

The longitudinal member 27 and the bottom plate 43 are shown in diagrammatic form in FIGS. 16, 17, 18 and 19 in four different working states of the computer 11, showing respectively the cover 12 and the base 17 separated from one another, the cover and the base being fitted/removed, removal of the cover and finally the cover fitted to the base.

In order to pass from the closed position to the open position, the body of the knob 56 is simply rotated in an anticlockwise direction about its axis. The rotational movement imparted to the knob 56 is also transmitted to the central pivot 57, to which the knob 56 is integrally connected by the pin 58, to the shaft 63 engaged in the central hole 74 and to the engagement element 62 rigidly connected to the shaft.

Figure 18:
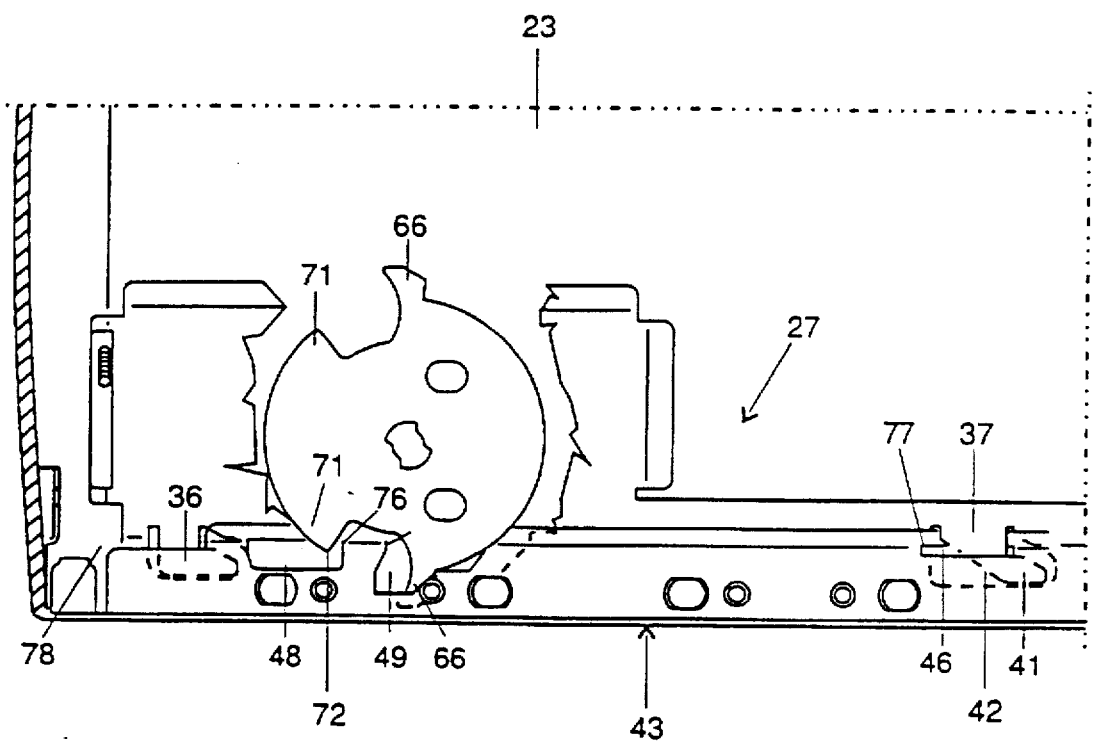

During its rotational stroke, the releasing tooth 71 enters the slot 48 and bears against a holding point 76 (FIG. 18). The force generated on the cover 12 is such that the movable cover 12 is moved forward with respect to the base 17, which remains fixed. The movement of the cover 12 towards the front part of the computer is also imparted to all of the devices integral therewith.

Figure 16:
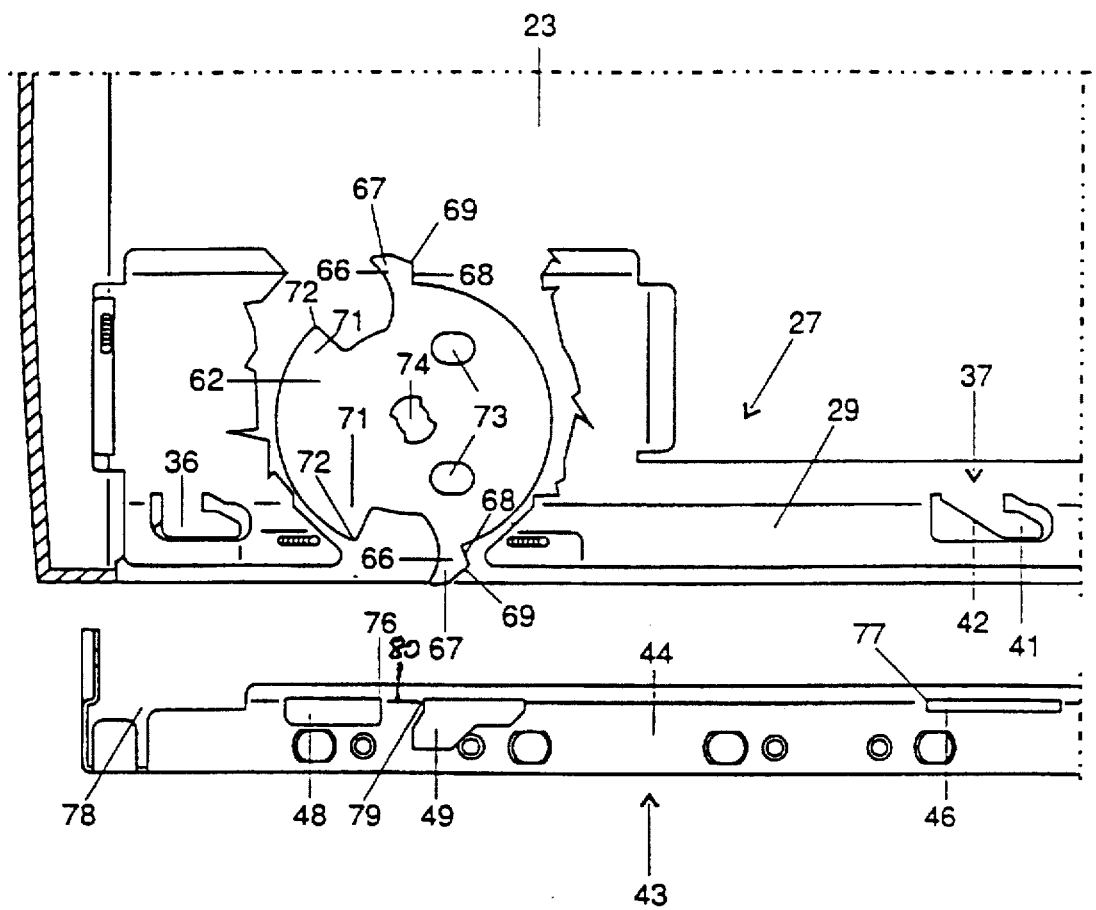

In particular, during the rectilinear movement imparted to the longitudinal member 27 integral with the cover 12, the fins 37 slide in the slots 46 and bring the inclined plane 42 to bear against a cover lifting point 77 (FIGS. 16 and 18). The obstacle formed by the cover lifting point 77 forms a fixed guide which causes the movement parallel to the base to change to the upward direction. At the same time, the stop notch 41 gradually emerges from the slot 46. The knob 56 is then rotated in the anticlockwise direction until the stroke limiter 68 forming part of the locking notch 66 bears against the mechanical stop 33.

When the stroke limiter 68 reaches the mechanical stop 33, the rotation of the knob 56, and thus the first stage of the removal of the cover 12 from the base body of the computer, is complete. In order to complete the removal, the movement imparted by the rotation of the knob 56 simply has to be continued with oblique upward manual actuation, until the longitudinal member 27 is completely released from the bottom plate 43, thereby allowing for complete separation of the cover from the base body.

In order to move operatively from the open arrangement illustrated in FIG. 2 to the closed arrangement, the cover 12 has to be located on the base body of the computer by superimposing the longitudinal member 27 on the bottom plate 43. This position, shown schematically in FIG. 12, aligns the hooked fins 37 with the corresponding engagement slots 46. At the same time, the locating fin 38 is situated in correspondence with the locating slot 47, and the fin 36 is opposite the port 78. The engagement element 62 is moreover situated in the removal position.

Figure 17:
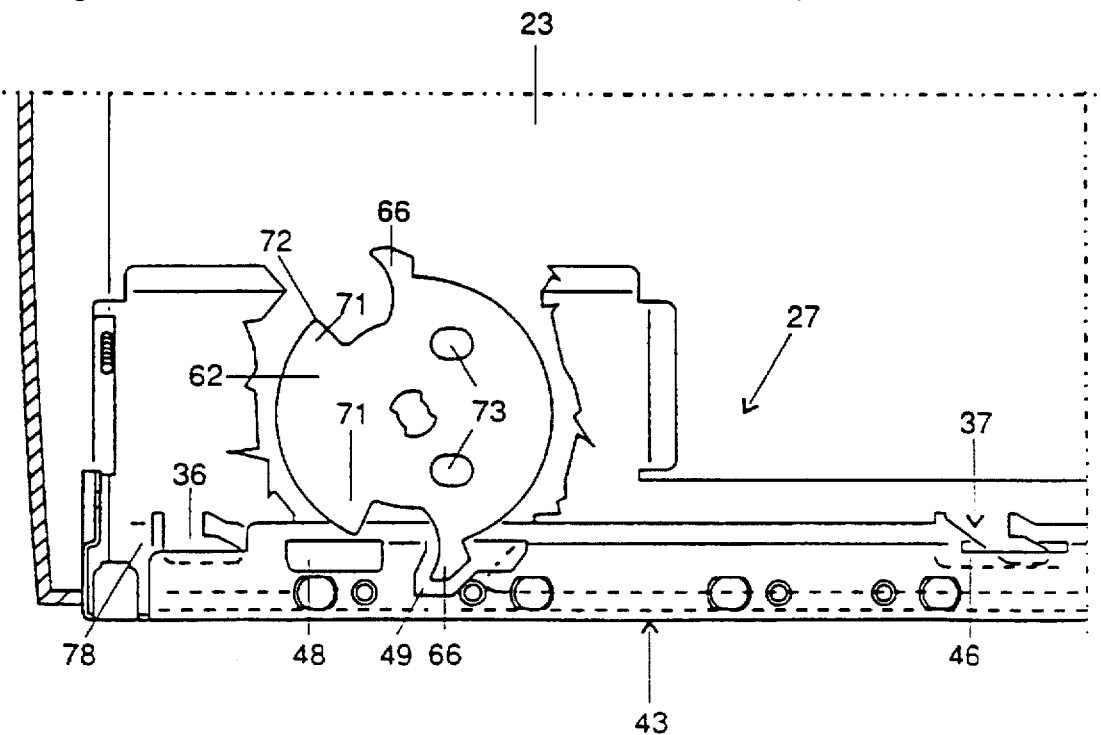

When the alignment of the locking elements is complete, the cover 12 is lowered so that the locating fins and the hooked fins enter into the respective seats in the interior of the bottom plate 43 (FIG. 17). When the movement begins, the stop notches 41 are situated in the centre of the slots, with the inclined part 42 bearing against the lifting points 77. The fitting operation is facilitated by slight inclination of the cover 12 towards the rear.

When the movement towards the bottom of the cover 12 is complete, the fitting operation continues with clockwise rotation of the knob 56. The movement applied to the knob 56 also rotates the central pivot 57 to which the knob 56 is integrally connected by the pin 58, the shaft 63 engaged in the central hole 64, and the engagement element 62 rigidly connected to the shaft.

Figure 19:
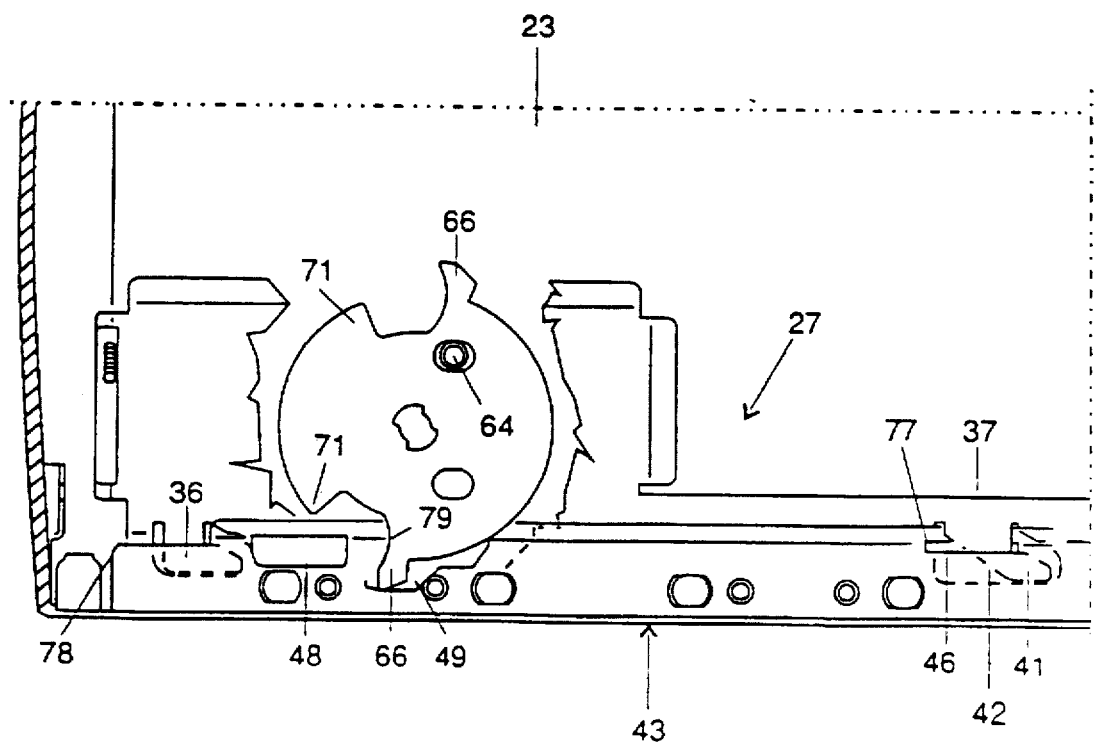

During its rotational stroke, the locking notch 66 forming part of the engagement element 62 enters into the slot 49 and bears against a holding point 79 (FIGS. 16 and 19). The part between the holding points 76 and 79 constitutes a fixed shoulder 80. The force generated is sufficient to urge the cover 12 towards the rear part of the computer 11. The movement imparted to the cover 12 is also transmitted to all of the devices integral therewith.

In particular, the movement is imparted to the longitudinal member 27 integral with the cover 12. The inclined planes 42 gradually leave the lifting points 77, thereby allowing the cover 12 to be lowered towards the base of the computer. The fins 37 slide into the slots 46, thereby fixing the stop notches 41 under the covered part of the slots 46 which form shoulders 50, their movement being guided by the locating fin 38 inserted into the locating slot 47. The knob 56 is rotated in the clockwise direction until the cover 12 is fitted to the base 17.

It will be clear that the casing illustrated can be subject to modifications and/or additions and/or the substitution of parts without thereby going beyond the scope of the invention.

We claim:

1. A casing for electronic equipment, such as personal computers and/or their peripherals, the casing comprising a base (17) for supporting mechanical and electronic components (19,21); a cover (12) having two lateral plates (14,16); holding means (76,79) located in the base; and a locking mechanism (24) which can be selectively actuated in order to lock the cover to the base for enclosing said components, said locking mechanism including first locking means (41) provided in the cover and second locking means (46) provided in the base; and wherein said cover is movable between a rest position in which it is released from the base (17) and said locking means (41,46) are disengaged, and a working position in which the cover is locked to the base and said locking means are engaged; characterised by cam means (62) supported by said lateral plates and having a lever form for co-operating with the holding means in order to move the cover (12) between said rest position and said work position.

2. A casing according to claim 1, characterised in that said first locking means (41) and said second locking means (46) are arranged on edges respectively of said cover (12) and said base (17), and in that said cam means (62) have a flat shape for being adapted to be arranged on said lateral plates and for being substantially flush with said lateral plates (14,16), so that said cam means (62) do not reduce the internal space between said lateral plates for housing said components (19,21), and do not protrude towards the exterior of said lateral plates.

3. A casing according to claim 2, characterised in that the cam means comprise at least one rotating element (62) located on the two lateral plates (14,16) of the movable cover (12), said rotating element being adapted to co-operate with a fixed shoulder (80) of said holding means for moving said cover from said rest position to said working position and vice versa.

4. A casing according to claim 3, characterised in that said rotating element (62) is shaped as a flat disk arranged on the plane of the corresponding lateral plate.

5. A casing according to claim 3, characterised in that said first locking means comprise a row of hooks (41), and said second locking means comprise a row of eyelets (46) adapted to house the row of hooks.

6. A casing according to claim 5, characterised in that the row of hooks (41) comprises a row of inclined planes (42) adapted to co-operate with a row of fixed guides (77), when the cover is moved from the working position to the rest position in order to facilitate the release of the cover from the base.

7. A casing according to claim 5, characterised in that the base (17) comprises two lateral edges each formed by a profile in the shape of an inverted U, in that the row of eyelets (46) and the row of guides (77) are located on the two lateral edges, and in that the row of hooks (41) is located at the free ends of the two lateral plates.

8. A casing according to any one of claims 3 to 7, characterised in that said rotating element (62) has two shoulders (66,71) adapted to co-operate with opposing edges (76,79) of said fixed shoulder (80).

9. A casing according to claim 3, characterised in that the locking means (41,46) and the cam means are disposed on either side of the casing and comprise respectively two fixed shoulders (80) located on two lateral edges of the base (17) and two rotating elements (62) located on the two lateral plates (14,16) of the movable cover (12).

10. A casing according to claim 9, characterised in that the two rotating elements (62) are each mounted for pivoting on the respective lateral plate of said cover and are adapted to rotate in both directions.

11. A casing according to claim 2, characterised by resilient locating means (64) for locating the cam means (62) in a reference position corresponding to the conditions under which the first and second locking means (41,46) are locked firmly together.

12. A casing according to claim 11, characterised in that the cam means (62) are actuated by a knob (56) which is movable manually from a position in which it projects from the casing to a position in which it is flush with the casing, and in that the locating means (64) comprise parts of the knob which engage the cam means when the knob is flush with the casing.

* * * * *